(12) United States Patent
Morimoto (10) Patent No.: US 10,509,398 B2
(45) Date of Patent: Dec. 17, 2019

(54) MANUFACTURING MANAGEMENT APPARATUS USING INSPECTION INFORMATION AND TRACE INFORMATION, AND MANUFACTURING SYSTEM

(71) Applicant: FANUC CORPORATION, Yamanashi (JP)

(72) Inventor: Kenjirou Morimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 84 days.

(21) Appl. No.: 15/834,153

(22) Filed: Dec. 7, 2017

(65) Prior Publication Data

US 2018/0173207 A1     Jun. 21, 2018

(30) Foreign Application Priority Data

Dec. 20, 2016   (JP) .................................. 2016-246725

(51) Int. Cl.
G05B 19/418        (2006.01)

(52) U.S. Cl.
CPC ...  *G05B 19/4188* (2013.01); *G05B 19/41875* (2013.01); *G05B 2219/31074* (2013.01);
(Continued)

(58) Field of Classification Search
CPC .......... G05B 19/4188; G05B 19/41875; G05B 2219/32324; G05B 2219/31336;
(Continued)

(56) References Cited

U.S. PATENT DOCUMENTS

2005/0096769 A1 * 5/2005 Bayoumi ............... G06Q 10/04
                                                                        700/99
2006/0047454 A1    3/2006 Tamaki et al.
(Continued)

FOREIGN PATENT DOCUMENTS

CN              1740934 A        3/2006
CN          101706886 A          5/2010
(Continued)

*Primary Examiner* — Chun Cao
(74) *Attorney, Agent, or Firm* — Hauptman Ham, LLP (57) ABSTRACT

A manufacturing management apparatus includes an operation information acquisition unit, a trace information acquisition unit, a storage unit, a manufacturing device determination unit, and a transfer destination indication unit. The storage unit stores inspection information on each article in association with the trace information. The manufacturing device determination unit creates combinations of the manufacturing devices that can perform manufacturing processes in consideration of operation information and trace information, determines a quality index from the inspection information for each of the created combinations, and determines, based on the quality index determined for each of the combinations, a combination of the manufacturing devices to be used. A transfer destination indication unit indicates a transfer destination of a part to a transfer device based on the determined combination of the manufacturing devices.

7 Claims, 3 Drawing Sheets

(52) U.S. Cl.
CPC .............. *G05B 2219/31336* (2013.01); *G05B 2219/32177* (2013.01); *G05B 2219/32324* (2013.01); *G05B 2219/45213* (2013.01); *Y02P 90/12* (2015.11); *Y02P 90/20* (2015.11); *Y02P 90/22* (2015.11); *Y02P 90/265* (2015.11); *Y02P 90/28* (2015.11)

(58) Field of Classification Search
CPC .......... G05B 2219/31074; G05B 2219/32177; G05B 2219/45213; Y02P 90/20; Y02P 90/12; Y02P 90/265; Y02P 90/28; Y02P 90/22
USPC .......................................................... 700/96
See application file for complete search history.

(56) References Cited

U.S. PATENT DOCUMENTS

2015/0234379 A1\* 8/2015 Vajaria .................... H01L 22/12
700/121
2019/0018397 A1\* 1/2019 Shiba ............... G05B 19/41865

FOREIGN PATENT DOCUMENTS

| | | |
|---|---|---|
| JP | H7-129672 A | 5/1995 |
| JP | H11-267952 A | 10/1999 |
| JP | 4239932 B2 | 3/2009 |
| JP | 5540659 B2 | 7/2014 |

\* cited by examiner

FIG. 1

MANUFACTURING MANAGEMENT APPARATUS USING INSPECTION INFORMATION AND TRACE INFORMATION, AND MANUFACTURING SYSTEM

RELATED APPLICATIONS

The present application claims priority to Japanese Patent Application No. 2016-246725 filed Dec. 20, 2016, the disclosure of which is hereby incorporated by reference herein in its entirety.

BACKGROUND OF THE INVENTION

1. Field of the Invention

The present invention relates to a manufacturing system in which articles are manufactured by a manufacturing facility, e.g., a manufacturing line or manufacturing cell including a plurality of manufacturing devices.

2. Description of the Related Art

Manufacturing facilities, e.g., manufacturing lines or manufacturing cells, are installed in factories. Such manufacturing facilities include a plurality of manufacturing devices that perform manufacturing processes such as machining and assembly. Parts are transferred into the manufacturing devices in a predetermined order so as to be machined and assembled, achieving uniformly manufactured articles.

In the related art, in order to manufacture uniform articles with a high yield in such a manufacturing facility, a plurality of identical manufacturing devices, e.g., machining devices configured to perform the same machining or assembling devices configured to perform the same assembly, may be disposed for the respective manufacturing processes. Specifically, when an article is obtained through a machining process and an assembling process, one of the identical machining devices can be selectively used in the machining process, whereas one of the identical assembling devices can be selectively used in the assembling process.

However, even if the quality (e.g., dimensional accuracy) of parts manufactured by the identical manufacturing devices satisfies requirement specifications, actually manufactured parts vary in quality among the manufacturing devices because of a bias of each of the manufacturing devices. Thus, ultimately obtained articles also vary in quality depending on a combination of the manufacturing devices used or the combination of manufactured parts.

It is desirable that such variations in quality are minimized to improve the quality of articles. However, strict requirement specifications set for the individual manufacturing devices and manufactured parts may increase cost.

Techniques for improving the quality of articles are described in, for example, Japanese Patent No. 4239932 and Japanese Patent No. 5540659.

Japanese Patent No. 4239932 describes a production management system that automatically specifies a process as a fundamental cause of variations in the quality of articles when an abnormality is found in the quality of articles in a manufacturing line for manufacturing articles through a plurality of manufacturing processes, and at least one inspection process.

Japanese Patent No. 5540659 describes a process planning apparatus that provides production planning for a manufacturing line for manufacturing articles through a plurality of manufacturing processes, each including selectable manufacturing devices. The process planning apparatus is configured such that a combination of manufacturing devices meeting quality standards is selected using a mean value of quality information for each process route and a standard deviation, and production planning for specifying a process route is then determined and presented to the outside based on the selected combination of manufacturing devices.

SUMMARY OF THE INVENTION

However, in the product management system of Japanese Patent. No. 4239932, it is understood that a specified cause of variations in the quality of articles needs to be manually corrected. Unfortunately, if the ultimately manufactured articles vary in quality, the product management system cannot automatically reduce the variations in quality from that time.

In the process planning apparatus described in Japanese Patent No. 5540659, it is understood that during the manufacturing processes for articles, the combination of the previously selected manufacturing devices cannot be changed according to the operating conditions of the manufacturing devices in the manufacturing processes. A quick response to an abnormality or jamming parts in any one of the manufacturing devices in the manufacturing processes cannot be ensured, disadvantageously reducing productivity. Moreover, the process planning apparatus does not relate to techniques for reducing variations in the quality of assemblies of machined parts.

In view of these circumstances, an object of the present invention is to provide a manufacturing management apparatus and a manufacturing system by which the quality of ultimately manufactured articles can be automatically improved when the parts vary in quality.

An aspect of the present disclosure relates to a manufacturing management apparatus that manages a manufacturing facility that performs a plurality of manufacturing processes, the manufacturing facility including: a plurality of manufacturing devices that are disposed in the respective manufacturing processes so as to perform the same processing; a transfer device that transfers a part to one of the manufacturing devices in each of the manufacturing processes; and an inspection device that inspects ultimately manufactured articles.

In order to solve the foregoing problems, according to a first aspect, the provided manufacturing management apparatus includes:

an operation information acquisition unit that acquires operation information indicating the current operating conditions of the respective manufacturing devices;

a trace information acquisition unit that acquires trace information indicating which one of the manufacturing devices has been used in each of the manufacturing processes during the manufacturing of the articles;

a storage unit that stores, for each of the articles, inspection information in association with the trace information, the inspection information indicating inspection results of the articles inspected by the inspection device; and a manufacturing device determination unit that creates combinations of the manufacturing devices that can perform the manufacturing processes in consideration of the operation information and the trace information, determines a quality index from the inspection information for each of the created combinations, and determines, based on the quality index determined for each of the combinations, a combination of the manufacturing devices to be used; and a transfer destination indication unit that indicates a transfer destination of the part to the transfer device based on the combination of the manufacturing devices determined by the manufacturing device determination unit.

According to a second aspect, in the manufacturing management apparatus of the first aspect, a manufacturing management apparatus is provided in which each time the parts need to be transferred by the transfer device, the manufacturing device determination unit determines a combination of the manufacturing devices.

According to a third aspect, in the manufacturing management apparatus of the first aspect, a manufacturing management apparatus is provided in which the manufacturing device determination unit determines the quality index based on all the pieces of the inspection information in the storage unit or a predetermined number of pieces of the latest inspection information.

According to a fourth aspect, in the manufacturing management apparatus of the first aspect, a manufacturing management apparatus is provided in which the operation information includes information on whether the manufacturing devices are operative or not and information on the number of parts allocated to the operative manufacturing devices.

According to a fifth aspect, a provided manufacturing system includes: the manufacturing management apparatus according to one of the first to fourth aspects; and the manufacturing facility managed by the manufacturing management apparatus, the manufacturing facility including: a plurality of manufacturing devices that are disposed in the respective manufacturing processes so as to perform the same processing; a transfer device that transfers a part to one of the manufacturing devices in each of the manufacturing processes; and an inspection device that inspects ultimately manufactured articles.

A detailed description about a typical embodiment of the present invention shown in the accompanying drawings further clarifies the object, characteristics, and advantages of the present invention and other objects, characteristics, and advantages of the present invention.

DETAILED DESCRIPTION

An embodiment of the present disclosure will be described below with reference to the accompanying drawings. In the reference drawings, the same constituent elements or functional units are indicated by the same reference symbols. For understanding, the scales of these drawings are optionally changed. A configuration in the drawing is merely an example for implementing the present invention and thus the present invention is not limited to the illustrated configuration.

Figure 1:
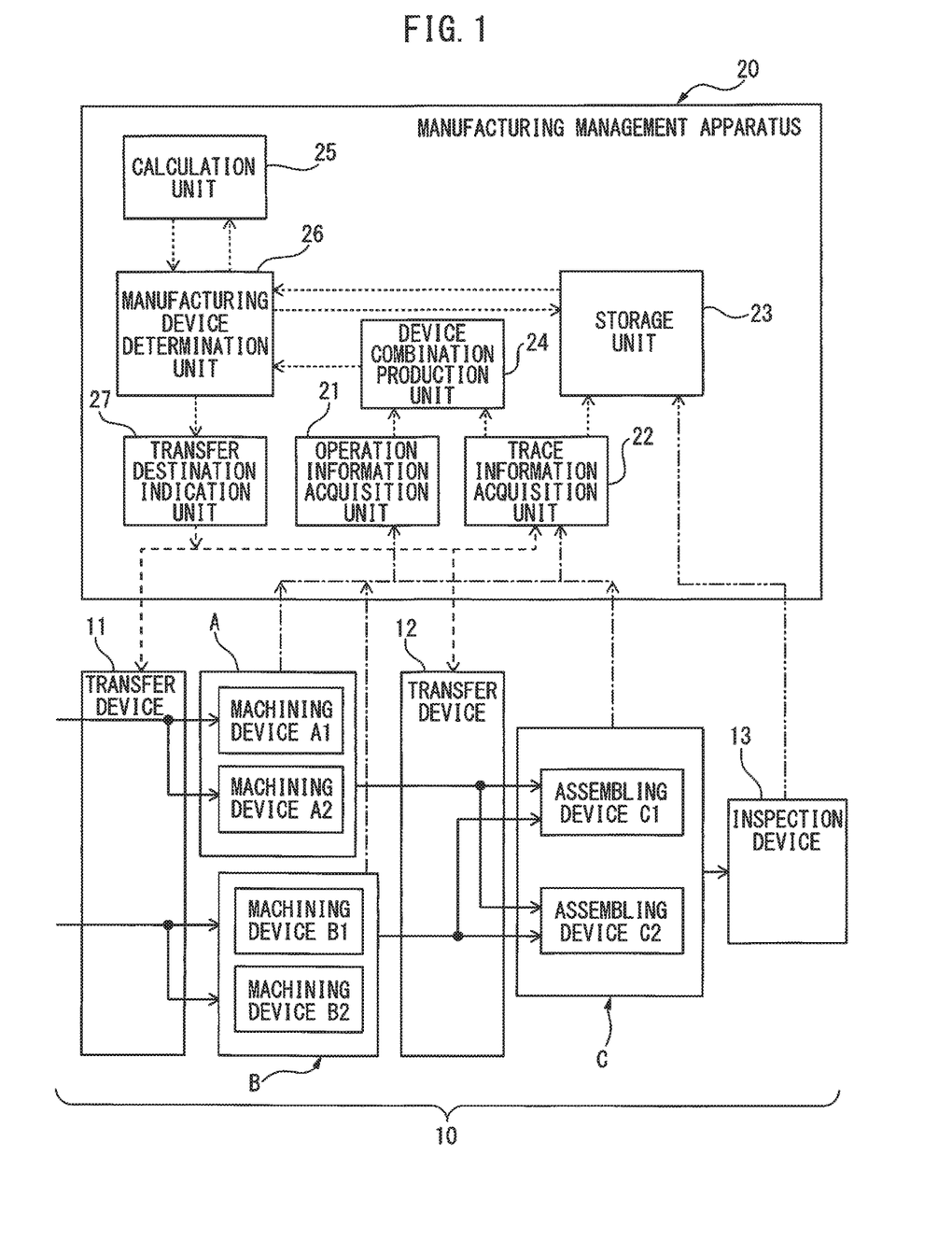
FIG. 1 is a functional block diagram schematically showing a manufacturing system including a manufacturing management apparatus according to an embodiment.

FIG. 1 is a functional block diagram schematically showing a manufacturing system including a manufacturing management apparatus according to an embodiment. In FIG. 1, solid arrows indicate parts and the flows of articles, dash-dot arrows indicate operation information on the manufacturing devices, dashed arrows indicate instructions to transfer destinations, a double-dashed arrow indicates inspection information, and dotted arrows indicate delivery of information between functional units constituting the manufacturing management apparatus.

The manufacturing system configured as shown in FIG. 1 is provided with a manufacturing facility 10 including a manufacturing line or a manufacturing cell where a plurality of manufacturing processes A to C are performed, and a manufacturing management apparatus 20 that manages the manufacturing facility 10.

For example, in the manufacturing facility 10, a first part machined in the manufacturing process A and a second part machined in the manufacturing process B are combined in the manufacturing process C so as to finish the article.

In the manufacturing process A, machining devices A1 and A2 configured to perform the same machining are disposed. In the manufacturing process B, other machining devices B1 and B2 configured to perform the same machining are disposed. In the manufacturing process C, assembling devices C1 and C2 configured to perform the same assembly are disposed.

The manufacturing facility 10 includes a first transfer device 11 that transfers a part to one of the machining devices A1 and A2 in the manufacturing process A and also transfers a part to one of the machining devices B1 and B2 in the manufacturing process B. In this case, the parts are workpieces.

The manufacturing facility 10 further includes a second transfer device 12 that transfers the first part machined in the manufacturing process A and the second part machined in the manufacturing process B to one of the assembling devices C1 and C2 in the manufacturing process C, and an inspection device 13 that inspects the articles obtained through the manufacturing process C.

The first transfer device 11 and the second transfer device 12 are robots or belt conveyors. The inspection device 13 is an apparatus that makes inspections such as a dimensional measurement.

Obviously, the present invention is not limited to the configuration of the manufacturing facility 10 shown in FIG. 1. The present invention is applicable to a manufacturing facility where articles are manufactured by performing multiple manufacturing processes. The manufacturing facility may have any configuration as long as the manufacturing facility includes multiple manufacturing devices that perform the same processing on at least one of the manufacturing processes. In the present embodiment, the machining devices A1 and A1 and the assembling devices C1 and C2 are illustrated as the manufacturing devices. The present invention is not limited to this configuration.

As shown in FIG. 1, the manufacturing management apparatus 20 includes an operation information acquisition unit 21, a trace information acquisition unit 22, a storage unit 23, a device combination unit 24, a calculation unit 25, a manufacturing device determination unit 26, and a transfer destination indication unit 27.

The operation information acquisition unit 21 acquires operation information on the current operating conditions of manufacturing devices including the machining devices A1, A2, B1, and B2 and the assembling devices C1 and C2. The operation information indicates, for example, whether the manufacturing devices are usable or whether the manufacturing devices can immediately manufacture parts.

The trace information acquisition unit 22 acquires trace information indicating which one of the manufacturing devices has been used in each of the manufacturing processes A to C during the manufacturing of articles.

In the manufacturing facility 10 of the present embodiment, the trace information is preferably acquired with symbols A1B1C1, A1B1C2, A1B2C1, A1B2C2, A2B1C1, A2B1C2, A2B2C1, and A2B2C2 indicating the manufacturing devices, for example, identification numbers (IDs) specific to the manufacturing devices.

The storage unit 23 stores inspection information in association with the trace information for each article, the inspection information indicating an inspection result of each article inspected by the inspection device 13. For example, manufactured articles are sequentially designated as model numbers, and then the trace information, the inspection information, and the model numbers during the manufacturing of the articles are stored in the storage unit 23 so as to be linked to one another.

The device combination unit 24 creates combinations of the manufacturing devices that can perform the manufacturing processes A, B, and C, in consideration of the operation information and the trace information. For example, a device combination of the machining device A1, the machining device B1, and the assembling device C1 is created. In this case, for the sake of convenience, the symbols of the manufacturing devices are used to indicate the combination of devices.

The calculation unit 25 determines a quality index from the inspection information, for each of the device combinations created by the device combination unit 24. In this case, the quality index may be, for example, the mean value and the standard deviation of pieces of inspection information. Specifically, if the inspection information acquired by the inspection device 13 is, for example, an error from the design dimensions of manufactured articles, the mean value and the standard deviation of segments of error data may be calculated as, for example, quality indexes.

The manufacturing device determination unit 26 determines a combination of manufacturing devices to be used, based on a quality index determined for each of the device combinations by the calculation unit 25, for example, the mean value and the standard deviation.

Specifically, the manufacturing device determination unit 26 searches the storage unit 23 for each of the created combinations of devices. If pieces of trace information are stored for the device combination in the storage unit 23, pieces of inspection information linked to the trace information are read from the storage unit 23. The calculation unit 25 calculates the mean value and the standard deviation of the pieces of inspection information read from the storage unit 23 for each of the created combinations of devices. The manufacturing device determination unit 26 determines a combination of devices to be used, based on a mean value and a standard deviation that are calculated for each of the created combinations of devices.

The trace information indicates which one of the manufacturing devices is used in each of the manufacturing processes A to C during the manufacturing the articles, and thus the trace information also indicates combinations of manufacturing devices used in the manufacturing processes of articles. Hence, as described above, based on the information on created combinations of devices, trace information on the device combinations can be retrieved from the storage unit 23.

In FIG. 1, the device combination unit 24, the calculation unit 25, and the manufacturing device determination unit 26 are separately illustrated. The functions of the device combination unit 24 and the calculation unit 25 are preferably included in the manufacturing device determination unit 26.

The manufacturing device determination unit 26 preferably determines a combination of manufacturing devices to be used each time parts need to be transferred by the first transfer device 11 and the second transfer device 12.

The transfer destination indication unit 27 indicates a part transfer destination to the first transfer device 11 and the second transfer device 12 according to the combination of manufacturing devices determined by the manufacturing device determination unit 26. In this case, a workpiece or a machined article is called a part.

In the foregoing manufacturing management apparatus 20, for example, if the dimensions of articles are measured as inspection information, a mean value (in this case, a mean error) and a standard deviation are calculated for inspection information for created combinations of devices, e.g., an error from a design value. Examples of calculation results are shown below:

A device combination A1B1C1 has a mean error of +0.03 and a standard deviation of 0.01;
A device combination A1B1C2 has a mean error of −0.02 and a standard deviation of 0.01.

The determination of a mean value and a standard deviation value for inspection information clarifies a normal distribution where measurement dimension data serving as the inspection information (in this case, dimension error data) is spread.

Initially, the number of samples is not sufficient to determine whether a mean error and a standard deviation have been biased or not. Thus, the manufacturing management apparatus 20 randomly combines the manufacturing devices of the manufacturing processes to C to manufacture articles. However, if the mean error and the standard deviation of manufactured articles are biased, a combination of devices with a small mean error and a small standard deviation is preferably used in the manufacturing management apparatus 20. In other words, a combination of devices with a small error and small variations in error is preferably used.

For example, the device combinations A1B1C1 and A1B1C2 have an equal standard deviations but the absolute value of mean error is smaller in the device combination. A1B1C2. Thus, the manufacturing management apparatus 20 changes to the device combination A1B1C2 to manufacture articles.

If the device combination A1B1C1 is selected to simultaneously manufacture articles, the device combination A2B2C2 should be automatically selected. In this case, the manufacturing management apparatus 20 of the present embodiment creates, for example, two device combinations indicated below. Two device combinations to be used are preferably determined based on the mean errors and the standard deviations of the created two device combinations.

| A1B1C1 | A2B2C2 |
| A1B1C2 | A2B2C1 |
| A1B2C1 | A2B1C2 |
| A1B2C1 | A2B1C2 |

Moreover, the calculation unit 25 preferably calculates a mean error and a standard deviation from a predetermined number of pieces of the latest inspection information instead of inspection information on all manufactured articles. Even if a change of the manufacturing conditions is not recognized by a person, a bias of the dimensions of actually manufactured articles may affect inspection information on the articles. Thus, a mean error and a standard deviation are calculated from the latest inspection information, allowing detection of an invisible change in article dimensions. Thus, the combination of manufacturing devices can be changed so as to improve the quality of articles.

Furthermore, in the manufacturing system, if a part transfer destination is continuously indicated to the transfer devices 11 and 12 from the transfer destination indication unit 27 according to a specific combination of devices, parts to be machined may be accumulated in a specific one of the manufacturing devices.

Alternatively, an abnormality may temporarily interfere with the manufacturing of a specific one of the manufacturing devices. In these cases, the specific manufacturing device is preferably configured to transmit a temporary disabled state of the manufacturing device to the operation information acquisition unit 21 of the manufacturing management apparatus 20 by using the operation information.

For example, only in the machining device A1, when an abnormality occurs that temporarily interrupts manufacturing or when parts to be machined are accumulated and no more parts can be allocated to be manufactured, the machining device A1 transmits a signal indicating the disabled state as a part of operation information to the manufacturing management apparatus 20. Thus, the manufacturing device determination unit 26 determines a device combination to be used from the following device combinations other than the machining device A1:

A2B1C1
A2B1C2
A2B2C1
A2B2C2

The present invention is not limited to a method in which the mean value and the standard deviation of pieces of inspection information are calculated as indexes and then a device combination to be used is determined based on the mean value and the standard deviation. For example, the median value and the minimum value of pieces of inspection information, which is obtained by inspecting the dimensions of manufactured articles, may be determined and used as indexes for determining a device combination.

In the foregoing embodiment, when a combination of manufacturing devices to be used is determined, a combination of manufacturing devices is preferably selected so as to improve the quality of articles. The present invention is not limited to this selection. A device combination where articles are manufactured with relatively low quality may not be selected. For example, for each device combination created by the device combination unit 24, the maximum value and the minimum value of pieces of inspection information may be determined, and then device combinations with determined maximum or minimum values larger than a predetermined error may be assigned lower priority in the determination of a device combination to be used.

Moreover, the manufacturing management apparatus 20, the first transfer device 11, the second transfer device 12, and the manufacturing devices including the machining devices A1, A2, B1, and B2 and the assembling devices C1 and C2 may be configured using a computer system including a storage unit, a control processing unit (CPU), and a communication unit. The storage unit is, for example, a read only memory (ROM) or a random access memory (RAM). Regarding the operation information acquisition unit 21, the trace information acquisition unit 22, the storage unit 23, the device combination unit 24, the calculation unit 25, the manufacturing device determination unit 26, and the transfer destination indication unit 27 that are included in the manufacturing management apparatus 20, the functions and operations can be achieved by causing the CPU to execute programs stored in a ROM.

Figure 2:
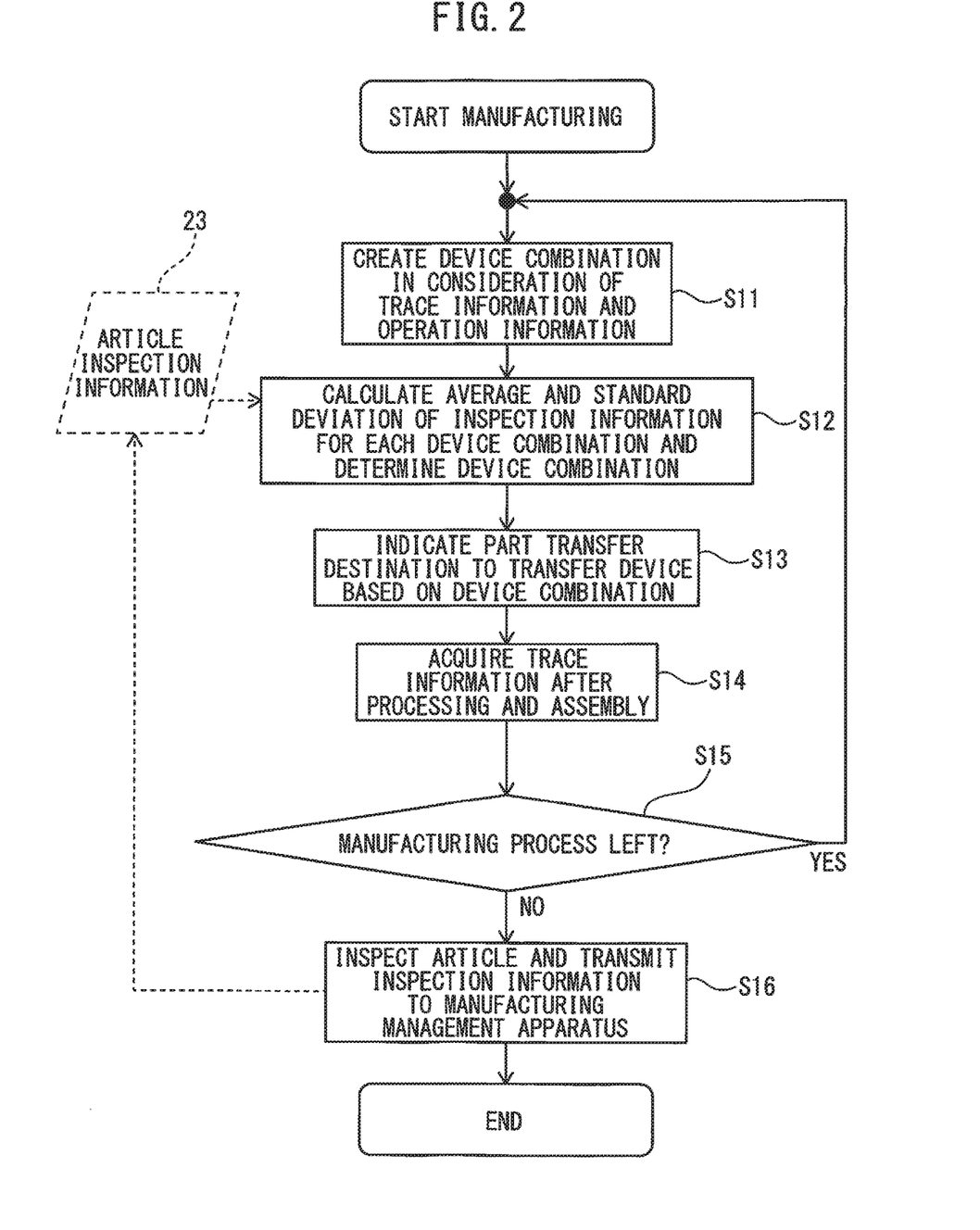
FIG. 2 is a flowchart showing a processing flow in the manufacturing management apparatus of FIG. 1.

FIG. 2 is a flowchart showing a processing flow in the manufacturing management apparatus 20 of the present embodiment. It is assumed that inspection information on at least a certain number of articles and trace information on each of the articles are accumulated in the storage unit 23 of the manufacturing management apparatus 20 before the start of the processing flow of FIG. 2. In the following explanation, inspection information is information on dimension errors (hereinafter referred to as error information) from a design value regarding, for example, at least a certain number of articles manufactured in the manufacturing facility 10 of FIG. 1. As a matter of course, the inspection information is merely exemplary.

At the start of manufacturing in the manufacturing facility 10, in step S11, the device combination unit 24 creates combinations of manufacturing devices that can perform the manufacturing processes A, B, and C in consideration of the trace information and the operation information.

Subsequently, in step S12, the manufacturing device determination unit 26 calculates, for each of the created combinations, the mean value and the standard deviation of inspection information stored in the storage unit 23, and determines, based on the calculated mean value and standard deviation, a combination of manufacturing devices to be used. In this case, a mean value and a standard deviation are a mean value (i.e., a mean error) and a standard deviation of the error information. Furthermore, based on the calculated mean value and standard deviation of error information for each of the device combinations, the manufacturing device determination unit 26 may determine a device combination where error information has a minimum mean value and a minimum standard deviation, as the combination of manufacturing devices to be used.

After that, in step S13, the transfer destination indication unit 27 indicates a part transfer destination to the transfer devices 11 and 12 based on the device combination determined by the manufacturing device determination unit 26.

In the subsequent step S14, the trace information acquisition unit 22 acquires trace information after parts are machined in the manufacturing processes A and B and then two machined parts are assembled in the manufacturing process C. For example, the trace information in the manufacturing process of articles is preferably recorded in the trace information acquisition unit 22 while being represented by identification numbers (IDs) such as A1B1C1 and A1B1C2 unique to the manufacturing devices.

The trace information can be acquired from a signal (processing completion signal) indicating the completion of processing, e.g., machining or assembly to the manufacturing management apparatus 20 from the manufacturing devices including the machining devices A1, A2, B1, and B2 and the assembling devices C1 and C2. Moreover, which one of the manufacturing devices processes parts is identified by a signal (transfer command) indicating a part transfer destination from the transfer destination indication unit 27 to the transfer devices 11 and 12. Thus, the trace information can be acquired based on the transfer command. Alternatively, such a transfer command may be used as auxiliary information when trace information is acquired from the processing completion signal as described above.

In the subsequent step S15, from the acquired trace information, the manufacturing management apparatus 20 decides whether or not there are manufacturing processes that have not yet been performed on parts. As a result, if there are manufacturing processes that have not been performed, a series of processing from step S11 to step S14 is repeated until the manufacturing process is completed.

In step S15, if it is decided that there are not manufacturing processes that have not yet been performed, the subsequent step S16 is performed.

In step S16, articles finished through all the manufacturing processes are inspected by the inspection device 13, and then inspection information on inspection results is transmitted to the manufacturing management apparatus 20 through a network or the like.

In this case, at the completion of the final manufacturing process C, articles are preferably attached with bar codes of encoded model numbers, e.g., serial numbers. Thus, the inspection device 13 can read a bar code on an article with a reader (not shown), inspect the article, and then transmit inspection information on the article with a model number linked to the inspection information.

When receiving the inspection information on the article from the inspection device 13 and the model number of the article, the manufacturing management apparatus 20 stores, in the storage unit 23, trace information acquired in the manufacturing process of the article so as to link the trace information with the inspection information. Thus, each time an ultimately manufactured article is inspected, trace information, inspection information, and a model number are stored in the storage unit 23 so as to be linked to one another.

Figure 3:
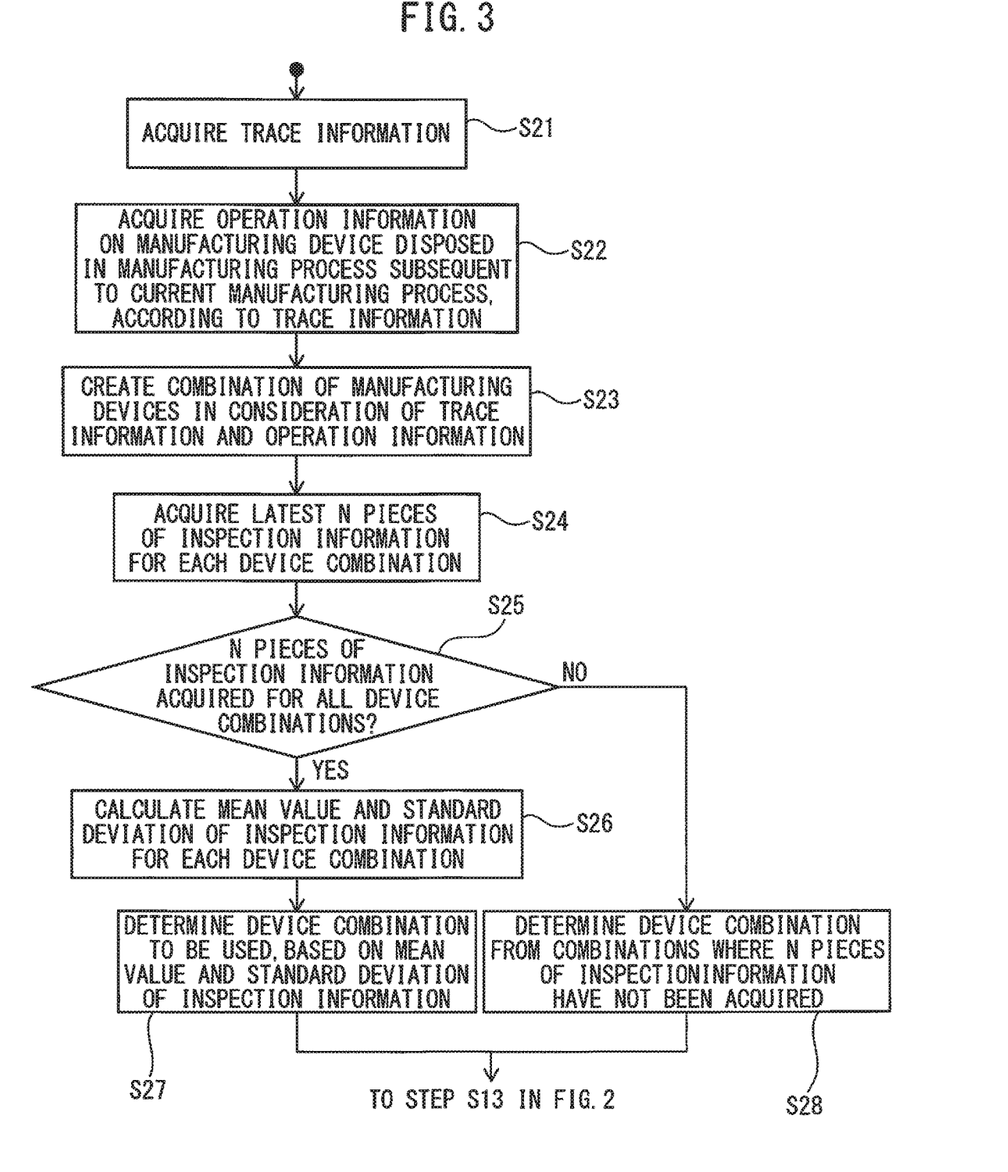
FIG. 3 is a flowchart specifically showing the processing contents of step S11 to step S12 shown in FIG. 2.

FIG. 3 is a flowchart showing an example of a specific procedure from the creation of a device combination (step S11 in FIG. 2) to the determination of a device combination to be used (step S12 in FIG. 2). Also in the following explanation, inspection information is the error information.

As described above, in order to determine, a combination of manufacturing devices to be used, the manufacturing management apparatus 20 of the present embodiment uses the mean value and the standard deviation of inspection information on ultimately manufactured articles. The determination of the mean value and the standard deviation of inspection information requires inspection information on at least a certain number of articles. However, at the beginning of the procedure, the storage unit 23 does not contain a sufficient number of pieces of inspection information and thus the manufacturing management apparatus 20 randomly combines the manufacturing devices disposed in the manufacturing processes A to C, leading to the accumulation of a large amount of inspection information in the storage unit 23.

First, in step S21, the manufacturing management apparatus 20 acquires, for example, trace information from the manufacturing facility 10. For example, the transfer destination indication unit 27 instructs the first transfer device 11 to transfer a part (workpiece) to the machining device A1 and transfer another part (workpiece) to the machining device B1. In this case, the trace information acquisition unit 22 acquires the use of the machining device Al and the machining device B1.

In the subsequent step S22, according to the trace information, the manufacturing management apparatus 20 acquires operation information on the manufacturing device disposed in the manufacturing process subsequent to the current manufacturing process. For example, the operation information acquisition unit 21 acquires operation information on the two assembling devices C1 and C2 disposed in the manufacturing process C.

After that, in step S23, the manufacturing management apparatus 20 creates combinations of manufacturing devices that can perform he manufacturing processes A to C, in consideration of the acquired trace information and operation information.

For example, as described above, it is assumed that the trace information acquisition unit 22 acquires trace information on the use of the machining device A1 and the machining device B1. In this case, if it is decided that the assembling devices C1 and C2 are not placed in abnormal conditions, device combinations such as A1B1C1 and A1B1C2 can be created.

Subsequently, in step S24, the manufacturing management apparatus 20 acquires the latest N (N is a positive integer) pieces of inspection information for each of the created device combinations. For example, the manufacturing device determination unit 26 of the manufacturing management apparatus 20 reads the latest N (N is a positive integer) pieces of inspection information from the storage unit 23 for each of the created device combinations. More specifically, the manufacturing device determination unit 26 searches the storage unit 23 for each of the created device combinations. If the storage unit 23 contains multiple pieces of trace information for the device combinations, the latest N pieces of inspection information are read from the storage unit 23, out of inspection information linked to the pieces of trace information.

After that, in step S25, the manufacturing device determination unit 26 decides whether or not N pieces of inspection information have been acquired for all the created device combinations. As a result, if it is decided that N pieces of inspection information have been acquired, the subsequent step S26 is performed.

In step S26, the manufacturing device determination unit 26 calculates the mean value and the standard deviation of N pieces of inspection information for each of the created device combinations.

Subsequently, in step S27, the manufacturing device determination unit 26 determines a combination of manufacturing devices to be used, based on the calculated mean value and standard deviation of the inspection information. If the inspection information is the error information, the manufacturing device determination unit 26 may determine a device combination where error information has a minimum mean value and a minimum standard deviation, as a combination of manufacturing devices to be used.

If it is decided that N pieces of inspection information cannot be acquired in step S25, the combination of manufacturing devices to be used is determined by the manufacturing device determination unit 26 such that articles are preferentially manufactured by a device combination where N pieces of inspection information have not been acquired (step S28).

The series of processing can determine a combination of manufacturing devices that can improve the quality of manufactured articles during the manufacturing of the articles, and accumulate, in the storage unit 23, a sufficient number of pieces of inspection information for determining the combination.

The manufacturing management apparatus 20 can achieve the following effects:

For the manufacturing processes A to C, the manufacturing facility 10, e.g., a manufacturing line managed by the manufacturing management apparatus 20, includes a plurality of identical manufacturing devices, e.g., the machining devices A1 and A2 configured to perform the same machining and the assembling devices C1 and C2 configured to perform the same assembly. In the manufacturing facility 10 thus configured, a combination of manufacturing devices to be used can be selected when identical articles are manufactured. According to the manufacturing management apparatus 20 of the present embodiment, when variations in the quality of ultimately manufactured articles are changed during manufacturing, a combination of manufacturing devices that can improve the quality of articles is determined from selectable combinations of manufacturing devices, thereby achieving higher quality. As a matter of course, in the determination of a combination of manufacturing devices to be used, a device combination where articles are manufactured with relatively low quality may not be selected.

Moreover, without inspecting parts manufactured by the manufacturing devices in the manufacturing processes, the quality of articles can be improved using inspection information on ultimately manufactured articles. In other words, the inspection device is not necessary for each of the manufacturing devices.

Each time a part needs to be transferred to one of the manufacturing devices in the manufacturing processes, the manufacturing management apparatus 20 of the present embodiment determines a combination of manufacturing devices that can improve quality. Specifically, the manufacturing management apparatus 20 during manufacturing acquires operation information indicating the current operating conditions of the manufacturing devices constituting the manufacturing facility 10 and trace information indicating which one of the manufacturing devices has been used during the manufacturing of articles, and then the manufacturing management apparatus 20 reflects the information to the determination of a combination of manufacturing devices. Thus, even if the manufacturing devices become inoperative during manufacturing, manufacturing can be continued so as to improve quality.

The operation information preferably includes information on whether the manufacturing devices are operative or not and information on the number of parts allocated to the operative manufacturing devices. In other words, the number of parts currently allocated to the operative manufacturing devices is identified so as to preferentially select a combination of manufacturing devices that can keep a proper operating rate in the determination of a combination of manufacturing devices that can improve quality.

The manufacturing facility 10 managed by the manufacturing management apparatus 20 of the present embodiment is located in, for example, a factory for manufacturing articles. The manufacturing management apparatus 20 is disposed in a manufacturing factory or in another building on the site of the manufacturing factory. In this case, the devices constituting the manufacturing facility 10 and the manufacturing management apparatus 20 are preferably connected so as to communicate with each other via, for example, a wired or wireless intranet. Alternatively, the manufacturing management apparatus 20 may be disposed in, for example, an office remote from the manufacturing factory. In this case, the devices constituting the manufacturing facility 10 and the manufacturing management apparatus 20 are preferably connected so as to communicate with each other via the Internet. The manufacturing management apparatus 20 in this case is preferably a cloud server.

Furthermore, the manufacturing management apparatus 20 may be configured so as to provide data communication with computers other than the manufacturing facility 10.

The present invention was described according to a typical embodiment. A person skilled in the art could understand that the embodiment can be changed and various other changes, omissions, and additions may be made without departing from the scope of the present invention.

The invention claimed is:

1. A manufacturing management apparatus that manages a manufacturing facility that performs a plurality of manufacturing processes,
the manufacturing facility comprising:
a plurality of manufacturing devices that are disposed in the respective manufacturing processes so as to perform the same processing;
a transfer device that transfers a part to one of the manufacturing devices in each of the manufacturing processes; and
an inspection device that inspects ultimately manufactured articles,
the manufacturing management apparatus comprising:
an operation information acquisition unit that acquires operation information indicating current operating conditions of the respective manufacturing devices;
a trace information acquisition unit that acquires trace information indicating which one of the manufacturing devices has been used in each of the manufacturing processes during the manufacturing of the articles;
a storage unit that stores, for each of the articles, inspection information in association with the trace information, the inspection information indicating inspection results of the articles inspected by the inspection device;
a manufacturing device determination unit that creates combinations of the manufacturing devices that can perform the manufacturing processes in consideration of the operation information and the trace information, determines a quality index from the inspection information for each of the created combinations, and determines, based on the quality index determined for each of the combinations, a combination of the manufacturing devices to be used; and
a transfer destination indication unit that indicates a transfer destination of the part to the transfer devices based on the combination of the manufacturing devices determined by the manufacturing device determination unit;
wherein the manufacturing device determination unit acquires a predetermined number of pieces of the latest inspection information for each of the created combinations, and, when the predetermined number of pieces of the inspection information cannot be acquired, determines the combination of the manufacturing devices to be used from the combinations where the inspection information have not been acquired.

2. The manufacturing management apparatus according to claim 1, wherein each time the parts need to be transferred by the transfer devices, the manufacturing device determination unit determines a combination of the manufacturing devices to be used.

3. The manufacturing management apparatus according to claim 1, wherein the manufacturing device determination unit determines the quality index based on all pieces of the inspection information in the storage unit or a predetermined number of pieces of the latest inspection information.

4. The manufacturing management apparatus according to claim 1, wherein the operation information includes information on whether or not the manufacturing devices are operative and information on the number of parts allocated to the operative manufacturing devices.

5. The manufacturing management apparatus according to claim 1, wherein in one of the plurality of manufacturing devices, in response
- to an abnormality that temporarily interrupts manufacturing or
- to a determination of a status that parts to be machined are accumulated and no more parts are allowed to be allocated to be manufactured,
- said one of the plurality of manufacturing devices is configured to transmit a signal indicating a disabled state as a part of the operation information to the manufacturing management apparatus.

6. The manufacturing management apparatus according to claim 1, wherein at least one of the plurality of manufacturing devices is configured to transmit a temporary disabled state of said at least one of the plurality of manufacturing devices to the operation information acquisition unit of the manufacturing management apparatus by using the acquired operation information.

7. A manufacturing system comprising:
- a manufacturing facility comprising:
    - a plurality of manufacturing devices that are disposed in each of a plurality of manufacturing processes so as to perform the same processing;
    - a transfer device that transfers a part to one of the manufacturing devices in each of the manufacturing processes; and
    - an inspection device that inspects ultimately manufactured articles, and a manufacturing management apparatus that manages the manufacturing facility, the manufacturing management apparatus comprising:
        - an operation information acquisition unit that acquires operation information indicating current operating conditions of the respective manufacturing devices;
        - a trace information acquisition unit that acquires trace information indicating which one of the manufacturing devices has been used in each of the manufacturing processes during the manufacturing of the articles;
        - a storage unit that stores, for each of the articles, inspection information in association with the trace information, the inspection information indicating inspection results of the articles inspected by the inspection device;
        - a manufacturing device determination unit that creates combinations of the manufacturing devices that can perform the manufacturing processes in consideration of the operation information and the trace information, determines a quality index from the inspection information for each of the created combinations, and determines, based on the quality index determined for each of the combinations, a combination of the manufacturing devices to be used; and
        - a transfer destination indication unit that indicates a transfer destination of the part to the transfer devices based on the combination of the manufacturing devices determined by the manufacturing device determination unit;
- wherein the manufacturing device determination unit acquires a predetermined number of pieces of the latest inspection information for each of the created combinations, and, when the predetermined number of pieces of the inspection information cannot be acquired, determines the combination of the manufacturing devices to be used from the combinations where the inspection information have not been acquired.

* * * * *